(12) United States Patent
Kawamura et al.

(10) Patent No.: US 6,563,537 B1
(45) Date of Patent: May 13, 2003

(54) IMAGE SIGNAL INTERPOLATION

(75) Inventors: Kazuo Kawamura, Miyagi (JP); Hideaki Yashima, Miyagi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/127,128

(22) Filed: Jul. 30, 1998

(30) Foreign Application Priority Data

Jul. 31, 1997 (JP) .............................................. 9-206856

(51) Int. Cl.$^7$ .............................................. H04N 5/208
(52) U.S. Cl. ...................... 348/252; 348/222.1; 358/532
(58) Field of Search ................... 348/272, 273, 348/282, 253, 625, 628, 629, 630, 252, 280; 382/199, 266

(56) References Cited

U.S. PATENT DOCUMENTS 5,382,976 A * 1/1995 Hibbard ...................... 348/266
5,754,710 A * 5/1998 Sekine et al. ................ 358/456
5,790,269 A * 8/1998 Masaki et al. .............. 345/421
6,229,578 B1 * 5/2001 Acharya et al. ............. 348/242

* cited by examiner

*Primary Examiner*—Wendy R. Garber
*Assistant Examiner*—Matthew L Rosendale
(74) *Attorney, Agent, or Firm*—Sughrue Mion, PLLC

(57) ABSTRACT

Image signal processing has the steps of: judging from four pixels adjacent to an object pixel whether the object pixel constitutes a single edge; judging whether the single edge is horizontal or vertical, if it is judged that the object pixel constitutes the single edge; and interpolating the object pixel in accordance with at least right and left two pixels adjacent to the object pixel in a horizontal direction, if it is judged that the single edge is horizontal, and interpolating the object pixel in accordance with at least upper and lower two pixels adjacent to the object pixel in a vertical direction, if it is judged that the single edge is vertical.

34 Claims, 16 Drawing Sheets

FIG.3A

| R | G | R |
|---|---|---|
| G | B | G |
| R | G | R |

FIG.3B

| G | R | G |
|---|---|---|
| B | G | B |
| G | R | G |

FIG.3C

| G | B | G |
|---|---|---|
| R | G | R |
| G | B | G |

FIG.3D

| B | G | B |
|---|---|---|
| G | R | G |
| B | G | B |

FIG.4A

| RB1 | G1  | RB2 |
|-----|-----|-----|
| G2  | RB0 | G3  |
| RB3 | G4  | RB4 |

FIG.4B

|    | G1 |    |
|----|----|----|
| G2 | Gc | G3 |
|    | G4 |    |

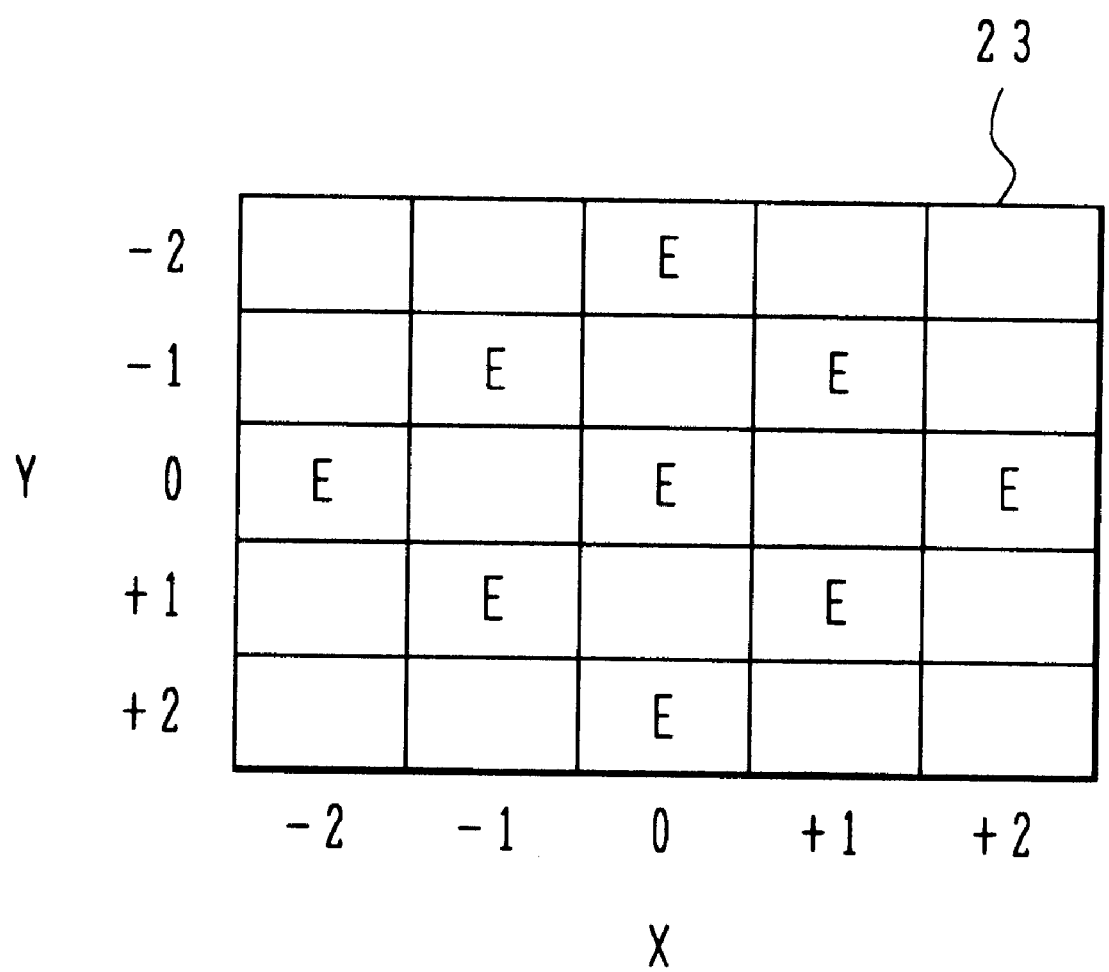

FIG.11A

| R | G1 | R |
|---|----|---|
| G2 | B | G3 |
| R | G4 | R |

FIG.11B

| ⧄ | G1 | ⧄ |
|---|----|---|
| G2 | Gc | G3 |
|  | G4 |  |

FIG.11C

| ⧄ | G1 |  |
|---|----|---|
| G2 | Gc | G3 |
|  | G4 | ⧄ |

FIG.11D

| | G1 | | — LN1 |
|---|----|---|---|
| G2 | Gc | G3 | — LN2 |
| | G4 | | — LN3 |

FIG.14A

|  | CL1 | CL2 | CL3 |
|---|---|---|---|
| LN1 | R11 | (R12) | R13 |
| LN2 | (R21) | (R22) | (R23) |
| LN3 | R31 | (R32) | R33 |

FIG.14B

|  |  |  |  |  |  |  |
|---|---|---|---|---|---|---|
| LN1 | G1 | G2 | G3 | G4 | G5 | ... |
| LN1 | R11 | (R12) | R13 | (R14) | R15 | ... |

FIG.14C

| CL1 | CL1 |
|---|---|
| G1 | R11 |
| G2 | (R21) |
| G3 | R31 |
| G4 | (R41) |
| G5 | R51 |
| ⋮ | ⋮ |

FIG.16A

| | G1 (255) | G2 (0) | G3 (255) | G4 (0) | G5 (255) | G6 (0) | G7 (255) |
|---|---|---|---|---|---|---|---|
| LN1 | R11 (255) | (R12) | R13 (255) | (R14) | R15 (255) | (R16) | R17 (255) |

FIG.16B

| Cr11 (0) | | Cr13 (0) | | Cr15 (0) | | Cr17 (0) |
|---|---|---|---|---|---|---|

FIG.16C

| | Cr12 (0) | | Cr14 (0) | | Cr16 (0) | |
|---|---|---|---|---|---|---|

FIG.16D

| | R12 (0) | | R14 (0) | | R16 (0) | |
|---|---|---|---|---|---|---|

FIG.16E

| R11 (255) | R12 (0) | R13 (255) | R14 (0) | R15 (255) | R16 (0) | R17 (255) |
|---|---|---|---|---|---|---|

IMAGE SIGNAL INTERPOLATION

This application is based on Japanese patent application No. 9-206856 filed on Jul. 31, 1997, the entire contents of which are incorporated herein by reference.

BACKGROUND OF THE INVENTION a) Field of the Invention

The present invention relates to techniques of processing image signals, and more particularly to image signal processing techniques with interpolation.

b) Description of the Related Art

FIG. 11A shows a fraction of image data picked up with a charge coupled device (CCD) camera. Image data is constituted of red (R), green (G), and blue (B) signals. A three-chip type sensor is made of three sensors for R, G, and B signals. In a single chip type sensor, R, G, and B signals are disposed on one sensor in a matrix such as shown in FIG. 11A. Various types of matrices are known. FIG. 11A shows an example a Bayer matrix. In the Bayer matrix, R and G signals are alternately disposed in one row (horizontal line), and in the next adjacent rows, G and B signals are alternately disposed. Therefore, a row of R and G signals and a row of G and B signals are alternately disposed.

The example shown in FIG. 11A shows 3×3 image data. There are four R signal pixels at the four corners of the 3×3 unit. R signal at the other pixel positions cannot be obtained so that it is necessary to obtain R signal through interpolation. In order to obtain R signal at the pixel position of G1 signal, it is interpolated through averaging of R signals at the adjacent right and left two pixels. R signal at the pixel of G4 signal is interpolated in the similar manner. R signals at the pixels of G2 and G3 signals are interpolated through averaging of R signals at the adjacent upper and lower pixels. R signal at the pixel of B signal is interpolated through averaging of R signals of the obliquely adjacent four pixels (at four corners of the 3×3 unit). B signals are also interpolated in the similar manner to R signals.

Next, interpolation for G signal will be described. The center pixel in the unit is B signal which has no information on G signal. It is therefore necessary to interpolate G signal. Assuming that G signal at the center pixel is Gc signal, this Gc signal can be obtained through averaging by the equation (1).

$$Gc=(G1+G2+G3+G4)/4 \quad (1)$$

where G1, G2, G3, and G4 signals are G signals at four pixels adjacent to Gc signal.

FIG. 11B shows 3×3 image data containing one horizontal edge. Pixels with hatching in FIG. 11B indicate that they have larger signals than other pixels. If Gc signal at the center pixel is obtained through averaging of four pixels, the horizontal edge of the image data becomes unsharp. In order to avoid this, if image data contains a horizontal edge, Gc signal is obtained by the following equation (2).

$$Gc=(G2+G3)/2 \quad (2)$$

A method of judging whether or not 3×3 image data contains a horizontal edge will be described. If image data contains an edge and the following conditional formula (3) is satisfied, it is judged that the image data contains a horizontal edge.

$$|G1-G4|>|G2-G3| \quad (3)$$

FIG. 11C shows 3×3 image data containing one vertical edge. Also in this image data, if Gc signal at the center pixel is obtained through averaging of four pixels, the vertical edge of the image data becomes unsharp. In order to avoid this, if image data contains a vertical edge, Gc signal is obtained by the following equation (4).

$$Gc=(G1+G4)/2 \quad (4)$$

A method of judging whether or not 3×3 image data contains a vertical edge will be described. If image data contains an edge and the following conditional formula (5) is satisfied, it is judged that the image data contains a vertical edge.

$$|G1-G4|<|G2-G3| \quad (5)$$

In the examples of FIGS. 11B and 11C, the image data contains one edge. In this case, by obtaining GC signal by the equation (2) or (4), a resolution of the edge can be retained.

FIG. 11D shows 3×3 image data containing two horizontal edges which are a horizontal edge between the first and second rows LN1 and LN2 and a horizontal edge between the second and third rows LN2 and LN3. It is not possible to judge from the conditional formulas (3) and (5) whether the image data has either a horizontal edge or a vertical edge, because the conditional formulas (3) and (5) become $|G1-G4|=|G2-G3|$.

Even if none of the conditional formulas (3) and (5) are satisfied, it is not proper to obtain Gc signal from the equation (1). It is rather preferable in this case to judge that the image data contains a horizontal edge and to obtain Gc signal from the equation (2). If Gc signal is obtained from the equation (1), only Gc signal takes a value different from the other values on one line constituting the second row LN2.

If one edge is contained in image data, proper interpolation of G signal is possible. However, if image data contains two edges, proper interpolation of G signal is impossible.

If image data contains noises, discrimination between horizontal and vertical edges may lead to a false judgement. If interpolation is performed with a false judgement of an edge, a proper interpolation is impossible.

With improper interpolation, an edge (contour) becomes unsharp and the resolution of an image is lowered. A pseudo color (essentially absent) is developed lowering reproductivity of an image.

G signal contains a large amount of luminance components and greatly influences a resolution. If an interpolation precision of G signal is increased, the resolution of an image can be improved. From this reason, the abovedescribed interpolation depending upon an edge direction is performed in interpolating G signal.

In contrast to this, since R and B signals less influence the resolution, it has been considered that a simple interpolation method is sufficient. R and G signals have been interpolated therefore by simple averaging of adjacent pixels.

As the interpolation precision of G signal is improved, the relative interpolation precision of R and B signals lowers. Namely, G, R and B signals are unbalanced. There is a limit in improvement on the image quality if the interpolation precision of only G signal is improved. If the interpolation precision of not only G signal but also R and B signals is improved, the image quality can be expected to be improved further.

SUMMARY OF THE INVENTION

It is an object of the present invention to provide image signal processing techniques capable of properly interpolating image signals having various patterns.

It is another object of the present invention to provide image signal processing techniques capable of properly interpolating image signals containing noises.

It is still another object of the present invention to provide image signal processing techniques capable of improving an interpolation precision of chrominance signals constituting an image.

According to one aspect of the present invention, there is provided an image signal processing apparatus comprising: first edge judgement means for judging from four pixels adjacent to an object pixel whether the object pixel constitutes a single edge; first edge direction judging means for judging whether the single edge is horizontal or vertical, if the first edge judging means judges that the object pixel constitutes the single edge; and interpolating means for interpolating the object pixel in accordance with at least right and left two pixels adjacent to the object pixel in a horizontal direction, if the first edge direction judging means judges that the single edge is horizontal, and for interpolating the object pixel in accordance with at least upper and lower two pixels adjacent to the object pixel in a vertical direction, if the first edge direction judging means judges that the single edge is vertical.

After it is judged whether the object pixel constitutes a single edge, the direction of the edge is judged so that the edge direction can be judged reliably. For example, the edge direction can be judged after the object pixel constituting two edges and the object pixel without edge are first excluded from signal processing. After the edge direction is judged reliably, the object pixel is interpolated so that a lowered resolution or generation of pseudo color can be prevented.

According to another aspect of the present invention, there is provided an image signal processing apparatus for sequentially interpolating each of a plurality of pixels in an image as the object pixel, comprising: edge direction judging means for judging whether an edge constituted by the object pixel is horizontal or vertical; storage means for storing an edge direction of each of the plurality of object pixels judged by the edge judging means; edge direction re-judging means for re-judging that the object pixel has a different direction if a majority of the edge directions of pixels adjacent to the object pixel and stored in the storage means has an edge direction different from an edge direction of the object pixel; and interpolating means for interpolating the object pixel in accordance with at least right and left two pixels adjacent to the object pixel in a horizontal direction, if the edge direction judging means or the edge direction re-judging means judges that the edge is horizontal, and for interpolating the object pixel in accordance with at least upper and lower two pixels adjacent to the object pixel in a vertical direction, if the edge direction judging means or the edge direction rejudging means judges that the edge is vertical.

After the edge direction of the object pixel is judged, the edge direction of the object pixel is re-judged in accordance with edge directions of nearby pixels. Therefore, even if a pixel contains noise, the edge direction can be judged reliably.

According to a further aspect of the present invention, there is provided an image signal processing apparatus comprising: chrominance signal acquiring means for acquiring at least green signals of some pixels of a one-dimensional pixel array and red or blue signals of other pixels; green signal interpolating means for obtaining green signals of all pixels through interpolation between pixels of the pixel array; first converting means for obtaining as a red color difference signal a difference between red and green signals of a same pixel in the pixel array and obtaining as a blue color difference signal a difference between blue and green signals of the same pixel; color signal interpolating means for interpolating the red color difference signal and the blue color difference signal by using pixels of the pixel array, in accordance with the read color difference signal and the blue color difference signal converted by the first converting means; and second converting means for obtaining the red signal and the blue signal by adding the green signal of the same pixel to the red color difference signal and the blue color difference signal interpolated by the color difference signal interpolating means.

Red and blue signals are interpolated by using not only the red and blue signals but also the green signal. An interpolation precision can therefore be improved. The green signals may include not only those acquired by the chrominance signal but also those interpolated by the green signal interpolating means. If the green signal interpolating means interpolates the green signals with high precision, also the red and blue signals can be interpolated with high precision. With the high precision interpolation of signals, the image quality can be improved and a lowered resolution and generation of pseudo colors can be prevented. interpolating means. If the green signal interpolating means interpolates the green signals with high precision, also the red and blur signals can be interpolated with high precision. With the high precision interpolation of signals, the image quality can be improved and a lowered resolution and generation of pseudo colors can be prevented.

BRIEF DESCRIPTION OF THE DRAWINGS

FIGS. 3A to 3D are diagrams showing four blocks which can divide the image data shown in FIG. 2.

FIG. 4A is a diagram showing two blocks of FIGS. 3A and 3D as one block f or the convenience of description, and FIG. 4B is a diagram showing only G signals of the block shown in FIG. 4A.

FIG. 8 is a diagram illustrating a method of correcting errors of edge data and interpolated data.

FIG. 11A is a diagram showing image signals in a Bayer matrix, FIG. 11B is a diagram showing a block containing one horizontal edge, FIG. 11C is a diagram showing a block containing one vertical edge, and FIG. 11D is a diagram showing a block containing two horizontal edges.

FIGS. 14A to 14C are diagrams illustrating a method of interpolating R signals.

FIGS. 16A to 16E are diagrams specifically illustrating a method of interpolating R signals.

DETAILED DESCRIPTION OF THE PREFERRED EMBODIMENTS

Figure 2:
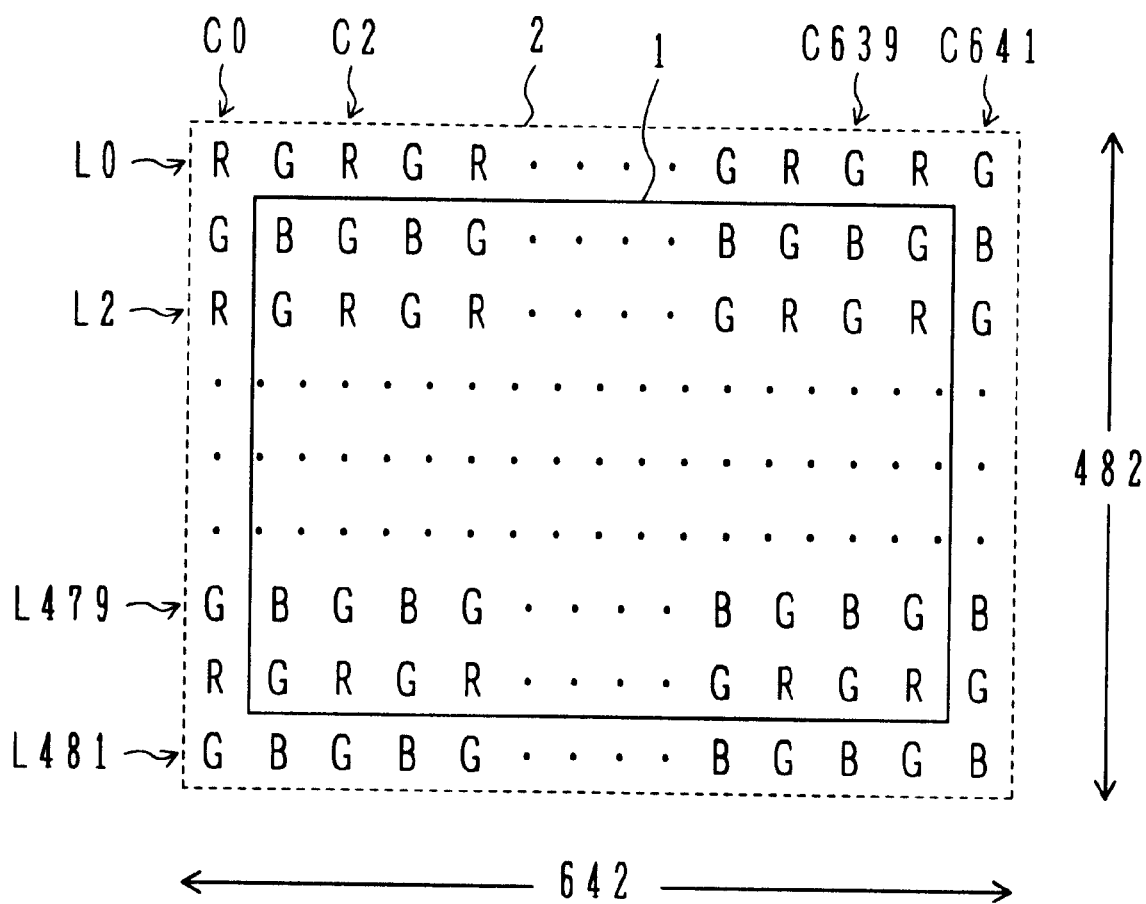
FIG. 2 is a diagram showing image data picked up with a single chip type charge coupled device (CCD) camera.

FIG. 2 shows image data picked up with a single chip type charge coupled device (CCD) camera. The image data has a size of, for example, 640×480 pixels of VGA specification.

The image data 1 has R, G and B signals (primary colors) in a Bayer matrix detected with a single chip sensor. In the Bayer matrix, R and G signals are alternately disposed in one row (horizontal line), and in the next adjacent rows, G and B signals are alternately disposed. Therefore, a row of R and G signals and a row of G and B signals are alternately disposed. G signals have a strong correlation with luminance (Y) signals and greatly influence a resolution. The Bayer matrix contains G signals more than other signals in order not to lower the resolution.

The image data 1 has 640×480 pixels each being constituted of one of R, G, and B color signals. Since each pixel is constituted of one color, it is necessary to interpolate the other two colors. In order to realize this interpolation, interpolation image data 2 is generated.

This image data 2 has 642×482 pixels and is generated by adding the highest row L0, lowest row L481, leftmost column C0, and rightmost column C641 to the image data 1.

The 0-th row (highest row) L0 is a copy of the second row L2, and the 481-th row (lowest row) L479 is a copy of the 479-th row L479. The 0-th column (leftmost column) C0 is a copy of the second column C2, and the 641-th column (rightmost column) C641 is a copy of the 639-th column C639.

As the image data 2 is divided into 3×3 blocks at arbitrary areas, four types of blocks are formed.

FIGS. 3A to 3D show divided four types of 3×3 blocks. Color signals at the center pixel at respective blocks are interpolated.

The center pixel of the block shown in FIG. 3A is B signal so that G and R signals at the center pixel are interpolated. Since R signal influences a resolution less than G signal, R signal at the center pixel is obtained through averaging. Namely, an average of four R signals in the 3×3 block is used as R signal at the center pixel. Since G signal influences the resolution more, G signal at the center axis is obtained by a method to be described later.

The center pixel of the block shown in FIG. 3B is G signal so that R and B signals at the center pixel are interpolated. Since R and B signal influence the resolution less than G signal, R and B signals at the center pixel are obtained through averaging. Namely, an average of two R signals in the 3×3 block is used as R signal at the center pixel, and an average of two B signals in the 3×3 block is used as B signal at the center pixel.

The center pixel of the block shown in FIG. 3C is G signal so that R and B signals at the center pixel are interpolated. Similar to the block shown in FIG. 3B, R and B signals at the center pixel are obtained through averaging.

The center pixel of the block shown in FIG. 3D is R signal so that G and B signals at the center pixel are interpolated. Since B signal influences the resolution less than G signal, B signal at the center pixel is obtained through averaging. Namely, an average of four B signals in the 3×3 block is used as B signal at the center pixel. Since G signal influences the resolution more, G signal at the center axis is obtained by a method to be described later.

The above interpolation is performed for the image data 2 (FIG. 2) in a raster scan sequence in the unit of 3×3 block. Specifically, blocks of the image data 2 are sequentially processed from the upper left to the upper right, and then the next blocks shifted lower by one pixel are sequentially processed from the left to the right. Thereafter, similar processes are repeated to lastly process the block at the lower right corner.

In the above description, R and B signals are interpolated through averaging. R and B signals may be interpolated by another method after G signal is interpolated, in order to improve the interpolation precision of R and B signals. This other method will be later described with reference to FIGS. 14 to 16.

A method of obtaining G signals at the center pixels shown in FIGS. 3A and 3D will be described.

FIG. 4A is a diagram showing the two blocks of FIGS. 3A and 3D as one block for the convenience of description.

RB0, RB1, RB2, RB3, and RB4 signals are all either R or B signal. RB0 signal is a color signal at the center pixel. G1 signal is G signal at an upper pixel of the center pixel. G2 signal is G signal at a left pixel of the center pixel. G3 signal is G signal at a right pixel of the center pixel. G4 signal is G signal at a lower pixel of the center pixel.

FIG. 4B shows a block using only G signals of the block shown in FIG. 4A. Gc signal is G signal at the center pixel to be interpolated.

Figure 5A:
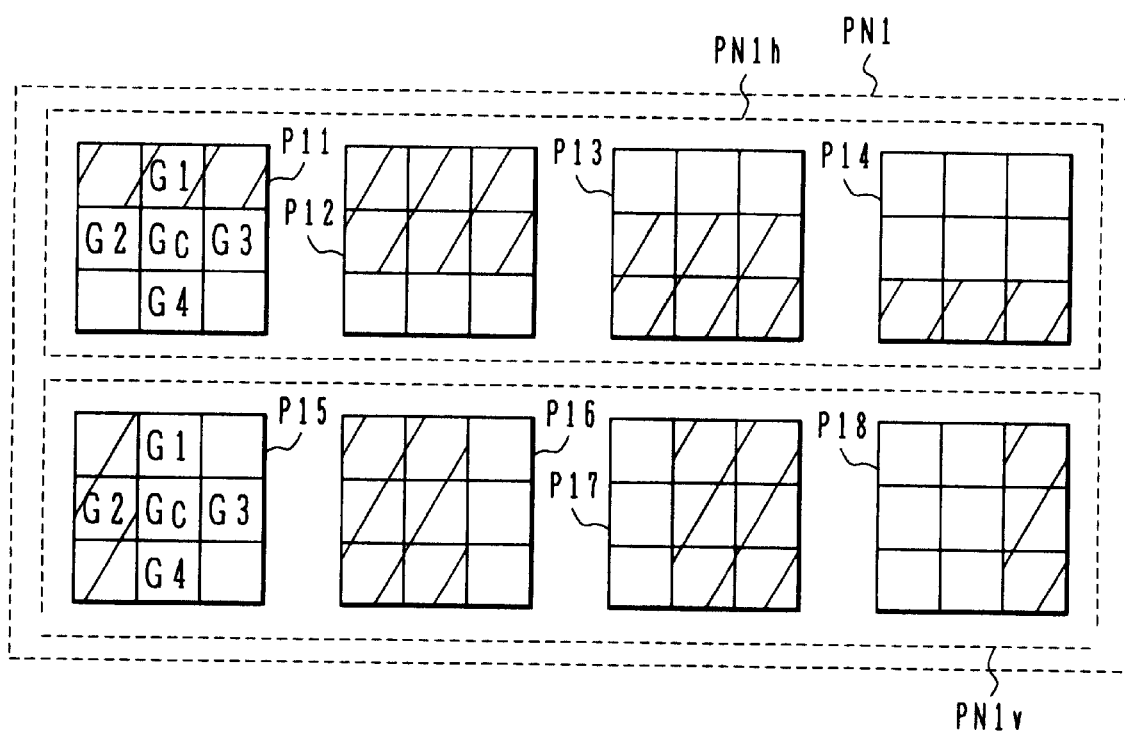
FIG. 5A is a diagram showing block patterns each containing one edge.
Figure 5B:
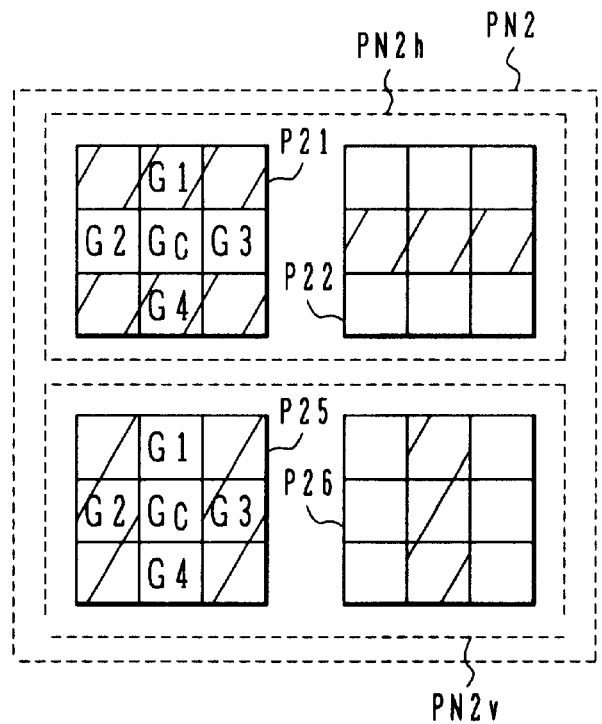
FIG. 5B is a diagram showing block patterns containing two edges.
Figure 5C:
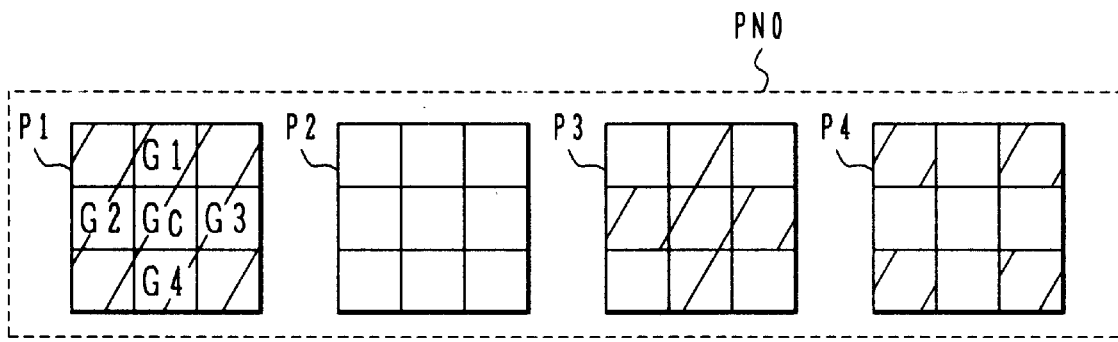
FIG. 5C is a diagram showing block patterns containing no edge.

FIGS. 5A to 5C show patterns of the block shown in FIG. 4B. Pixels with hatching have a larger pixel signal than other pixels without hatching.

FIG. 5A shows patterns PN1 of a block containing one edge (contour). In these patterns PN1, the center pixel constitutes one edge. The patterns PN1 are classified into patterns PN1$h$ of the blocks containing a horizontal edge and patterns PN1$v$ of the blocks containing a vertical edge.

The horizontal edge patterns PN1$h$ have blocks P11 and P13 having an edge between the first and second rows and blocks P12 and P13 between the second and third rows. In the case of the horizontal edge patterns PN1$h$, Gc signal is obtained by the following equation (6).

$$Gc=(G2+G3)/2 \tag{6}$$

The vertical edge patterns PN1$v$ have blocks P15 and P17 having an edge between the first and second columns and blocks P16 and P17 between the second and third columns. In the case of the vertical edge patterns PN1$v$, Gc signal is obtained by the following equation (7).

$$Gc=(G1+G4)/2 \tag{7}$$

FIG. 5B shows patterns PN2 of a block containing two edges. In these patterns PN2, the center pixel constitutes two edges. The patterns PN2 are classified into patterns PN2$h$ of the blocks containing two horizontal edges and patterns PN2$v$ of the blocks containing two vertical edges.

The horizontal edge patterns PN2$h$ have blocks P21 and P22 having an edge between the first and second rows and an edge between the second and third rows. In the case of the horizontal edge patterns PN2$h$, Gc signal is obtained by the equation (6).

The vertical edge patterns PN2$v$ have blocks P25 and P26 having an edge between the first and second columns and an edge between the second and third columns. In the case of the vertical edge patterns PN2$v$, Gc signal is obtained by the equation (7).

FIG. 5C shows patterns PN0 of blocks having no edge. In the patterns PN0, the center pixel does not constitute an edge. The patterns PN0 have so-called no-contrast blocks, including blocks P1 and P2 having the same signals at all pixels, and blocks P3 and P4 having G1, G2, G3, and G4 signals which are generally the same signals. In the case of the noedge patterns PN0, Gc signal is obtained through averaging using the following equation (8).

$$Gc=(G1+G2+G3+G4)/4 \tag{8}$$

Next, a method of interpolating Gc signal will be described specifically.

Figure 1:
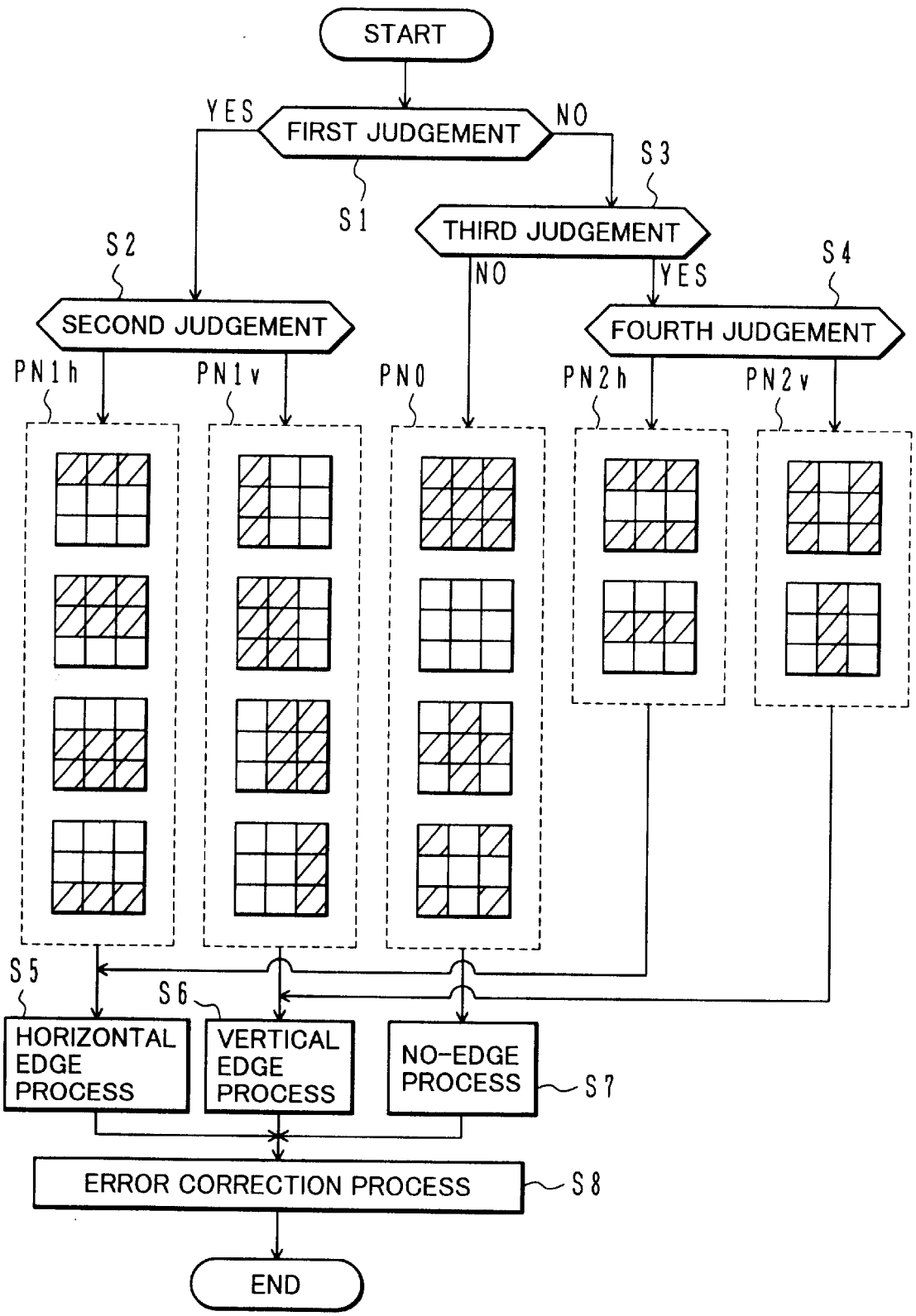
FIG. 1 is a flow chart illustrating processes to be executed by an image signal processing apparatus or computer programs according to an embodiment of the invention.

FIG. 1 is a flow chart illustrating a method of processing Gc signals according to the embodiment of the invention.

(1) First Judgement (Step S1)

At Step S1 the first judgement is performed which judges whether or not an object block belongs to the block pattern PN1 containing one edge. If the following conditional formula (9) is satisfied, it is judged that the object block belongs to the block pattern PN1 (FIG. 5A) containing one edge. The flow follows a YES arrow to enter a second judgement (Step S2). If the conditional formula (9) is not satisfied, it is judged that the object block belongs to the block pattern PN2 (FIG. 5B) or PN0 (FIG. 5C). The flow follows a NO arrow to enter a third judgement (Step S3).

$$(|G1-G4|>\delta 1 \text{ or } (|G2-G3|)>\delta 1$$

and $$\||G1-G4|-|G2-G3|\|>\delta 1 \tag{9}$$

where δ1 is a threshold value. By setting δ1 to a predetermined value or larger, it is possible to judge whether or not |G1−G4|, |G2−G3|, and ||G1−G4|−|G2−G3|| have significant values.

The threshold value δ1 preferably takes a value determined by the following equation (10) using G1, G2, G3, and G4.

$$\delta 1 = \alpha \times (|G1-G2|+|G1-G3|+|G1-G4|+|G2-G3|+|G2-G4|+|G3-G4|) \tag{10}$$

It is preferable that δ1 takes a value of about 0.1. By adjusting α, optimization is possible without hardly affected by noise level or the like of the original image data.

If the threshold value δ1 is too small, the influence of noise components becomes large and misjudgment may occur. From this reason, δ1 is made to have a limit value. Namely, if δ1 becomes a constant β or smaller, δ1 is set to β. If G signal is 10 bits ($2^{10}$=1024), this constant β is preferably set to about 64.

(2) Second judgement (Step S2)

At Step S2 the second judgement is performed which judges whether or not an edge contained in an object block is a horizontal edge or a vertical edge. If the following conditional formula (11) is satisfied, it is judged that the object block belongs to the horizontal edge block pattern PN1$h$ (FIG. 5A) containing one edge. The flow advances to a horizontal edge process (Step S5). If the conditional formula (11) is not satisfied, the following conditional formula (12) is satisfied and it is judged that the object block belongs to the vertical edge block pattern PN1$v$ (FIG. 5A). The flow advances to a vertical edge process (Step S6).

$$|G1-G4|>|G2-G3| \tag{11}$$

$$|G1-G4|<|G2-G3| \tag{12}$$

(3) Third Judgement (Step S3)

At Step S3 the third judgement is performed which judges whether or not an object block belongs to the block pattern PN2 containing two edges. If the following conditional formula (13) is satisfied, it is judged that the object block belongs to the block pattern PN2 (FIG. 5B) containing two edges. The flow follows a YES arrow to enter a fourth judgement (Step S4). If the conditional formula (13) is not satisfied, it is judged that the object block belongs to the block pattern PN0 (FIG. 5C) having no edge. The flow follows a NO arrow to enter a no-edge process (Step S7).

$$\||G1+G4|-|G2+G3|\|>\delta 2 \tag{13}$$

where δ2 is a threshold value. By setting δ2 to a predetermined value or larger, it is possible to judge whether or not ||G1+G4|−|G2+G3|| has a significant value.

The threshold value δ2 preferably takes a value determined by the following equation (14) using the threshold value δ1.

$$\delta 2=\gamma \times \delta 1 \tag{14}$$

It is preferable that the constant γ takes a value of about 0.5. By adjusting this constant γ, optimization is possible without hardly affected by noise level or the like of the original image data.

(4) Fourth Judgement (Step S4)

Figure 6A:
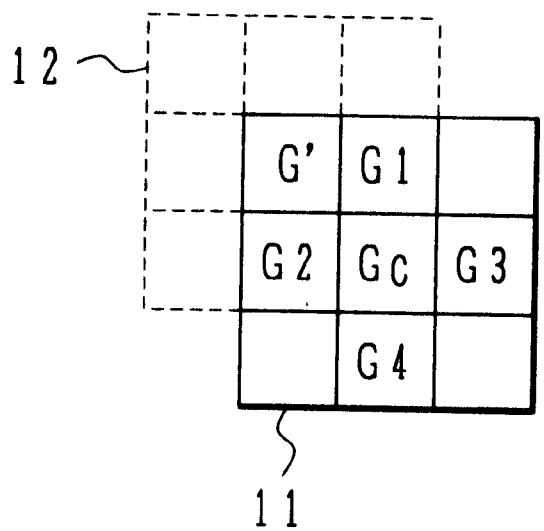
FIG. 6A is a diagram illustrating a method of detecting an edge direction of an object pixel in a block containing two edges.
Figure 6B:
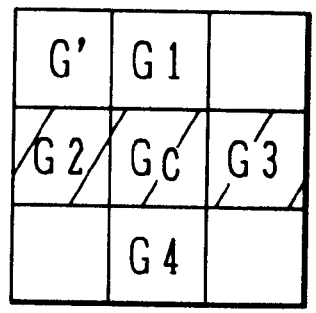
FIG. 6B is a diagram showing a block containing two horizontal edges.

At Step S4 the fourth judgement is performed which judges whether or not an edge contained in an object block is a horizontal edge or a vertical edge. As shown in FIG. 6A, G' signal is used which is present at an upper left pixel of the center pixel in the object block 11. G' signal is obtained through interpolation of a block 12 which is an upper left block of the object block 11. The block 12 is processed before the object block 11 is processed. Therefore, G' signal is a signal already known when the object block 11 is processed.

Figure 6C:
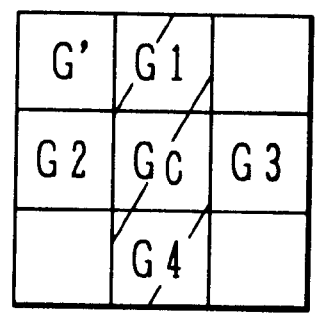
FIG. 6C is a diagram showing a block containing two vertical edges.

If the following conditional formula (15) is satisfied, it is judged that the object block belongs to the horizontal edge block pattern PN2$h$ (FIG. 5B), and the flow advances to the horizontal edge process (Step S5). If the conditional formula (15) is not satisfied and the following conditional formula (16) is satisfied, it is judged as shown in FIG. 6C that the object block belongs to the vertical edge block pattern PN2$v$ (FIG. 5B), and the flow advances to the vertical edge process (Step S6). If both the conditional formulas (15) and (16) are not satisfied, the flow is forcibly advanced to Step S5 or S6, or may be advanced to Step S7.

$$|G2-G'|>|G1-G'| \tag{15}$$

$$|G2-G'|<|G1-G'| \tag{16}$$

Judgement by this method cannot be applied to the pixel at the first row because the upper left block does not exist. However, since the first row pixels are at an edge of one image frame, a visual image is not so much degraded even if noises are generated by misjudgment.

Instead of using G' signals at the upper left pixel of the center pixel, a signal at the upper right of the center pixel may be used. Furthermore, if a process is executed from the lower to upper of pixel data, G signal at the lower left or right of the center pixel may be used.

(5) Horizontal Edge Process (Step S5).

At Step S5 the horizontal edge process is performed. Namely, Gc signal of the object block is obtained from the following equation (17) to thereafter advance to an error correction process (Step S8).

$$Gc=(G2+G3)/2 \tag{17}$$

Figure 7A:
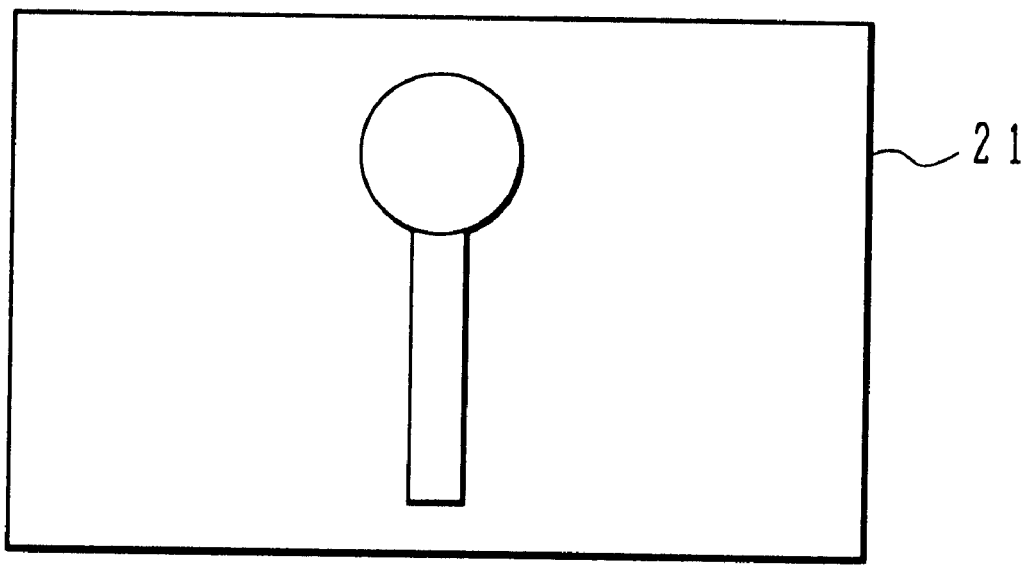
FIG. 7A, is a diagram showing image data.
Figure 7B:
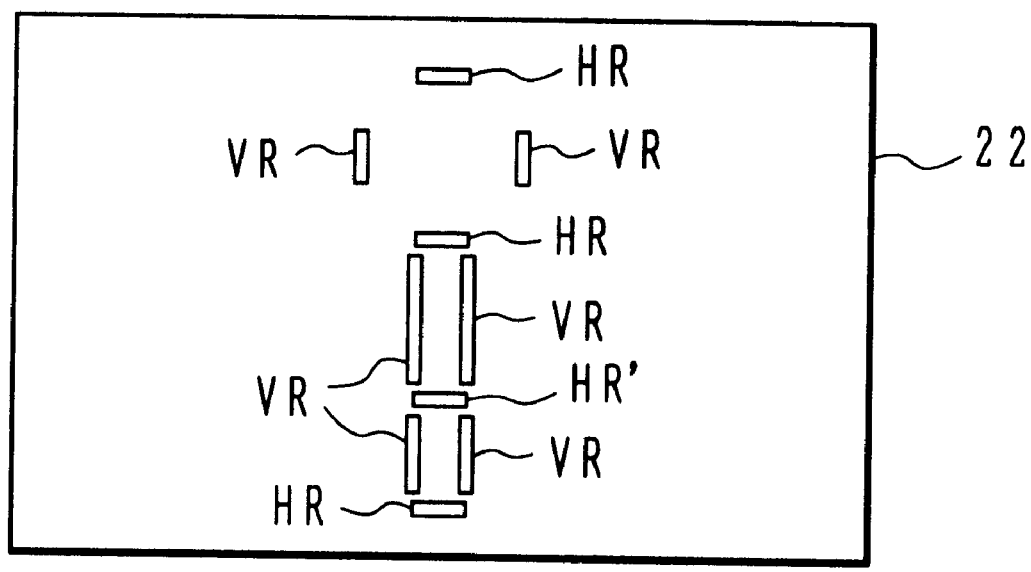
FIG. 7B is a diagram showing edge data.

Further, as shown in FIG. 7B, in order to memorize that the object block has the horizontal edge pattern, horizontal edge data HR is stored. Edge data 22 as shown in FIG. 7B corresponds to edge data of the image data 21 shown in FIG. 7A. This edge data 22 is edge data of the block whose Gc signal was obtained. A horizontal edge portion in the image data 21 is stored as the horizontal edge data HR in the edge data 22. For example, the horizontal edge data HR is stored as a value "+1".

(6) Vertical Edge Process (Step S6).

At Step S6 the vertical edge process is performed. Namely, Gc signal of the object block is obtained from the following equation (18) to thereafter advance to the error correction process (Step S8).

$$Gc=(G1+G4)/2 \tag{18}$$

Further, as shown in FIG. 7B, in order to memorize that the object block has the vertical edge pattern, vertical edge data VR is stored as the edge data 22. A vertical edge portion in the image data 21 (FIG. 7A) is stored as the vertical edge data VR in the edge data 22. For example, the vertical edge data VR is stored as a value "−1".

(7) No-edge process (Step S7)

At Step S7, the no-edge process is performed. Namely, Gc signal of the object block is obtained from the following equation (19) to thereafter advance to the error correction process (Step S8).

$$Gc=(G1+G2+G3+G4)/4 \tag{19}$$

Further, in order to memorize that the object block has the no-edge pattern, no-edge data (not shown) is stored in the edge data 22. For example, the no-edge data is stored as a value "0".

(8) Error Correction Process (Step S8)

At Step S8 the error correction process is performed. For example, in some case, horizontal edge data HR' is erroneously stored as the edge data 22 (FIG. 7B) instead of correct vertical edge data VR. This horizontal edge data HR' or an interpolation error in the image data becomes visually conspicuous. Namely, one point appears as the interpolation error on a vertical edge line. Although this interpolation error is about several % of the image data, it is preferable to correct it. In order to correct this interpolation error, the following error correction process is executed.

The edge data 22 is processed in the unit of 5×5 block shown in FIG. 8. The horizontal axis of the block is an X-axis, and the vertical axis is a Y-axis. Edge data E at the coordinate (X, Y) is expressed by edge data E(X, Y). The edge data E(X, Y) is generated at the pixel position at which Gc signal was obtained.

Edge data E(0, 0) is edge data at the center of the block 23. If it is judged from the edge error correction process that the edge data E(0, 0) has an error, this error is corrected.

First, eight data sets around E(0, 0) are added together to obtain a value RD from the equation (20).

$$RD=E(1, 1)+E(1, -1)+E(-1, 1)+E(-1, -1)+E(2, 0)+E(0, 2)+E(-2, 0)+E(0, -2) \tag{20}$$

As described earlier, of the edge data, the horizontal edge data HR is represented by the value "+1", the vertical edge data VR is represented by the value "−1", and the no-edge data is represented by the value "0".

If the nearby eight data sets contain a relatively large amount of horizontal edge data HR, the value RD is positive, whereas if the data sets contain a relatively large amount of vertical edge data VR, the value RD is negative.

Next, the object edge data E(0, 0) is compared with the value RD. If the value RD is positive (horizontal edge) although the data E(0, 0) is "−1" (vertical edge), the data E(0, 0) is changed to "+1" (horizontal edge) and Gc signal is again calculated by the horizontal edge process (Step S5). Namely, since most of nearby data sets are horizontal edges, the data E(0, 0) is corrected to a horizontal edge.

If the value RD is negative (vertical edge) although the data E(0, 0) is "+1" (horizontal edge), the data E(0, 0) is changed to "−1" (vertical edge) and Gc signal is again calculated by the vertical edge process (Step S6). Namely, since most of nearby data sets are vertical edges, the data E(0, 0) is corrected to a vertical edge.

If the data E(0, 0) is "0" (no edge), correction is not performed irrespective of what value the value RD takes. Correction is not necessary because an error possibility is small and noises are not visually conspicuous even if there is an error, when the data E(0, 0) is "0".

Even if the image data contains noises, the correct edge direction can be judged again and Gc signal can be interpolated by performing the error correction process. By judging or re-judging the correct edge direction and interpolating G signal, it becomes possible to prevent the resolution from being lowered and the pseudo color (essentially absent) from being produced.

Figure 9:
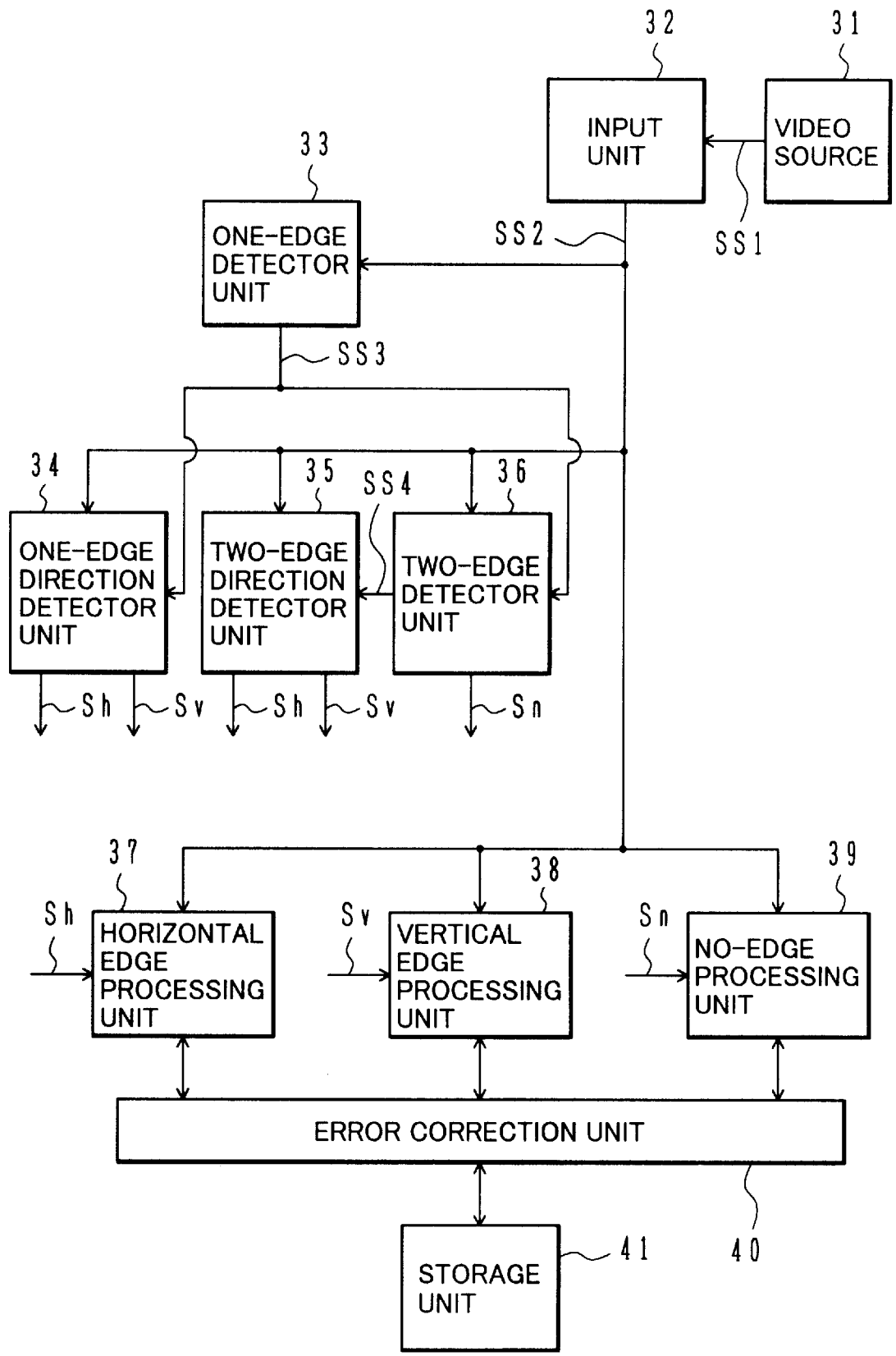
FIG. 9 is a block diagram showing the structure of an image signal processing apparatus according to an embodiment of the invention.

FIG. 9 shows the structure of an image signal processing apparatus according to the embodiment. This image signal processing apparatus realizes the processes illustrated in the flow chart of FIG. 1.

A video source 31 is, for example, a CCD camera, a memory or the like and supplies image data SS1. An input unit 32 receives the image data SS1 from the video source 31 and outputs 3×3 block data SS2.

A one-edge detector unit 33 corresponding to Step S1 shown in FIG. 1 receives the block data SS2 from the input unit 32, judges whether the block data belongs to the one-edge pattern PN1, and outputs a detection signal SS3 to a one-edge direction detector unit 34 and to a two-edge detector unit 36.

Upon reception of the detection signal SS3, the oneedge direction detector unit 34 corresponding to Step S2 shown in FIG. 1 detects the direction of an edge contained in the block data SS2, and outputs an edge signal Sh or Sv. If the horizontal edge is detected, the horizontal edge signal Sh is output to a horizontal edge processing unit 37, whereas if the vertical edge is detected, the vertical edge signal Sv is output to a vertical edge processing unit 38.

If the detection signal SS3 is not supplied to the two-edge detector unit 36 corresponding to Step S3 shown in FIG. 1, this unit 36 receives the block data SS2 from the input unit 32 and judges whether the block data belongs to the two-edge pattern PN2. If belongs, a detection signal SS4 is supplied to a two-edge direction detector unit 35, whereas if not, a no-edge signal Sn is output to a no-edge processing unit 39.

Upon reception of the detection signal SS4, the twoedge direction detector unit 35 corresponding to Step S4 in FIG.

1 detects the direction of the edge contained in the block data SS2, and outputs the edge. signal Sh or Sv. If the horizontal edge is detected, the horizontal edge signal Sh is output to the horizontal edge processing unit 37, whereas if the vertical edge is detected, the vertical edge signal Sv is output to the vertical edge processing unit 38.

Upon reception of the horizontal edge signal Sh, the horizontal edge processing unit 37 corresponding to Step S5 shown in FIG. 1 obtains Gc signal from the equation (17) by using the block data SS2 and stores the edge data E of the value "+1".

Upon reception of the vertical edge signal Sv, the vertical edge processing unit 38 corresponding to Step s6 shown in FIG. 1 obtains Gc signal from the equation (18) by using the block data SS2 and stores the edge data E of the value "−1".

Upon reception of the no-edge signal Sn, the no-edge processing unit 39 corresponding to Step S7 shown in FIG. 1 obtains Gc signal from the equation (19) by using the block data SS2 and stores the edge data E of the value "0".

An error correction unit 40 is connected to the horizontal edge processing unit 37, vertical edge processing unit 38, and no-edge processing unit 39. If the edge data E contains any error, the error correction unit 40 corresponding to Step S8 shown in FIG. 1 obtains again Gc signal corresponding to the error. The error correction unit 40 may obtain Gc signal by itself or may instruct the horizontal edge processing unit 37 or vertical edge processing unit 38 to obtain Gc signal again.

A storage unit 41 stores therein the image data SS1 and interpolation signals Gc. In addition to the interpolation signals Gc, interpolation signals for R and B signals are also stored in the storage unit 41. The storage unit 41 stores R, G, and B signals of one image frame. R, G, B signals may be converted thereafter into Y, Cb, and Cr signals. Y signal is a luminance signal, Cb signal is a blue color difference signal, and Cr signal is a red color difference signal.

At Step S4 shown in FIG. 1, discrimination between the horizontal and vertical edges is made by using G' signal at the upper left of the center pixel. However, since this G' signal was obtained through interpolation, G' signal itself may be a signal obtained by edge misjudgment. If there is an edge misjudgment in obtaining G' signal, there is a high possibility that the present pixel to be interpolated has an edge misjudgment. An edge misjudgment of one pixel in one unit (block) may induce another edge misjudgment of a pixel in another adjacent block, and an edge misjudgment may be linked to pixels in some area. If this edge misjudgment occurs in a broad area, even the error correction process at Step S8 of FIG. 8 cannot correct errors. The error correction process at Step S8 is effective only when edge misjudgments are distributed in the block. If an edge misjudgment occurs in a broad area, noises in this area become visually conspicuous.

Another method of judging an edge direction at Step S4 shown in FIG. 1 will be described. Instead of detecting an edge direction by using G' signal, the following edge direction judgement is performed. Since an edge direction judgement by using only G signal as in the above method is difficult, R and B signals are additionally used for an edge direction judgment. Gc signal at the center pixels in the blocks shown in FIGS. 3A and 3D are required to be obtained through interpolation. The block shown in FIG. 3A will first be described.

FIGS. 12A to 12D show patterns of the 3×3 block of FIG. 3A, each containing two edges. Object blocks to be precessed at Step S4 in FIG. 1 are those judged at Step S3 as containing two edges. The object blocks have therefore four patterns shown in FIGS. 12A to 12D. The blocks shown in FIG. 12A and 12B have two edges, an edge between the first row LN1 and second row LN2 and an edge between the second row LN2 and third row LN3. The blocks shown in FIG. 12C and 12D have two edges, an edge between the first column CL1 and second column CL2 and an edge between the second column CL2 and third column CL3.

First, a difference DV between the vertical direction is obtained by the following equation (21).

$$DV=|(R1+G1+R2)-(G2+B0+G3)|+|(R3+G4+R4)-(G2+B0+G3)| \quad (21)$$

The difference DV in the vertical direction is a sum of a difference between the first row LN1 (sum of three pixels) and second row LN2 (sum of three pixels) and a difference between the third row LN3 (sum of three pixels) and second row LN2 (sum of three pixels). This difference is detected without giving a priority to any particular one of three R, G and B signals.

Similarly, a difference DH in the horizontal direction is obtained by the following equation (22).

$$DH=|(R1+G2+R3)-(G1+B0+G4)|+|(R2+G3+R4)-(G1+B0+G4)| \quad (22)$$

The difference DH in the horizontal direction is a sum of a difference between the first column CL1 (sum of three pixels) and second column CL2 (sum of three pixels) and a difference between the third column CL3 (sum of three pixels) and second column CL2 (sum of three pixels).

The relation between the vertical and horizontal differences DV and DH are classified broadly into the following three types (1) to (3). The following interpolation is performed for each type (1) to (3) to obtain Gc signal at the center pixel.

(1) DV>DH

If the vertical difference DV is larger than the horizontal difference DH, it is judged that the object block contains horizontal edges. As described previously, in the case of horizontal edges, Gc signal is obtained through averaging of right and left adjacent pixels by the following equation.

$$Gc=(G2+G3)/2$$

(2) DH>DV

If the vertical difference DV is smaller than the horizontal difference DH, it is judged that the object block contains vertical edges. In the case of vertical edges, Gc signal is obtained through averaging of upper and lower adjacent pixels by the following equation.

$$Gc=(G1+G4)/2$$

(3) DV=DH

If the vertical difference DV is equal to the horizontal difference DH, the edge direction cannot be judged. In this case, Gc signal is obtained through averaging of adjacent four pixels by the following equation.

$$Gc=(G1+G2+G3+G4)/4$$

In stead of averaging of four pixels, Gc signal may be obtained forcibly through averaging of two pixels assuming that the edge is vertical or horizontal. In this case, although an edge direction may be misjudged, this misjudgment can be corrected by the following error correction process (Step S8 in FIG. 1).

The vertical and horizontal differences DV and DH may be calculated by the following more simplified equations, not limiting only to the equations (21) and (22), with expected advantageous effects as above. With the following equations (23) and (24), the differences DV and DH are obtained by using sums of two pixels in each row or column.

$$DV=|(R1+R2)-(G2+G3)|+|(R3+R4)-(G2+G3)| \quad (23)$$

$$DH=|(R1+R3)-(G1+G4)|+|(R2+R4)-(G1+G4)| \quad (24)$$

FIGS. 13A to 13D show patterns of the 3×3 block of FIG. 3D, each containing two edges. The vertical edge difference DV and horizontal edge difference DH are calculated from the following equations (25) and (26) and thereafter, Gc signal is calculated by classifying the difference relation into three types similar to those described above.

$$DV=|(B1+G1+B2)-(G2+R0+G3)|+|(B3+G4+B4)-(G2+R0+G3)| \quad (25)$$

$$DH=|(B1+G2+B3)-(G1+R0+G4)|+|(B2+G3+B4)-(G1+R0+G4)| \quad (26)$$

Similar to the equations (23) and (24), the equations (25) and (26) may be changed to more simplified equations to reduce the amount of calculation.

Although even this edge direction judgement method cannot perfectly remove a misjudgment, a misjudgment is less linked to other pixels. Even if there are misjudgments, misjudgments are likely to be distributed. Such distributed misjudgments can be efficiently corrected by the error correction process (Step S8 in FIG. 1) so that misjudgments can be reduced drastically. Final edge direction judgement becomes generally correct so that Gc signal can be properly interpolated and the image quality can be improved.

The G signal interpolation method has been described above. Next, the interpolation method for R and B signals will be described. After the G signals are completely interpolated, the R and B signals can be interpolated by the following method. In the following, the R signal interpolation method will be described. The B signal can be interpolated in the similar manner.

FIG. 14A shows only R signals of the 3×3 block shown in FIG. 3A. Of this 3×3 block, signals R11, R13, R31, and R33 at four corners are picked up with a CCD camera, and the other signals R12, R21, R22, R23, and R32 are obtained through interpolation. A method of obtaining R12 signal will be described. R32 signal can be obtained in the similar manner.

FIG. 14B shows pixels at the first row LN1 containing R12 signal to be interpolated. The upper cells indicate G signals at the first row LN1, including all pixels of interpolated green signals G1 to G5, . . . The lower cells indicate signals R11, R13, R15, . . . at odd pixels at the same first row LN1 picked up with a CCD camera, and signals R12, R14, . . . at even pixels to be interpolated. For example, the first pixel has GI green signal and RIl red signal.

Figure 15A:
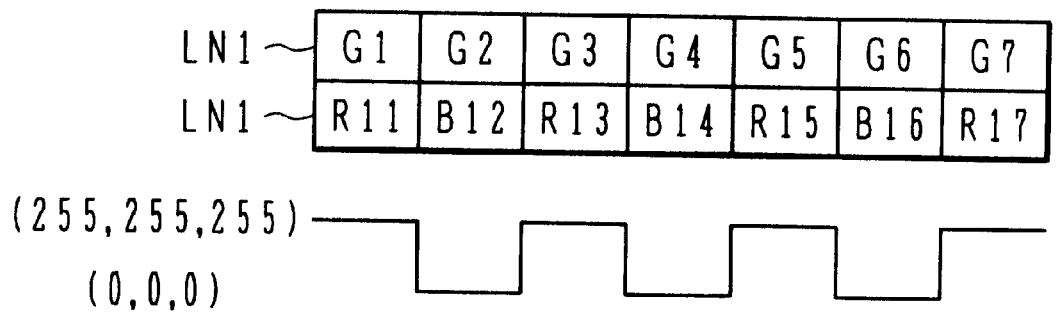
FIGS. 15A to 15D are diagrams showing chrominance signals when black and white stripe patterns are input.

FIG. 15A shows chrominance signals at the first row LN1 in the upper area of FIG. 15A, and a light signal incident upon the first row LN1 in the lower area thereof.

Consider that white color is incident upon the pixels of the first, third, fifth, and seventh columns, and black color is incident upon the pixels of the second, fourth, and sixth columns. If a chrominance signal is expressed by 8 bits, white color is represented by red signal of "255", green signal of "255", and blue signal of "255". In FIG. 15A, white color is indicated by (255, 255, 255). Black color is represented by red signal of "0", green signal of "0", and blue signal of "0". In FIG. 15A, black color is indicated by (0, 0, 0).

FIGS. l5B to 15D show the chrominance signal shown in FIG. 15A of each color component.

Figure 15B:
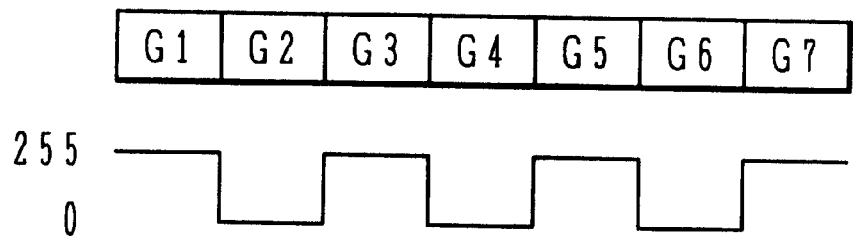

FIG. 15B shows pixel positions of green signals in the upper area of FIG. 15B and amplitudes of green signals in the lower area thereof. Green signals are G1=G3=G5=G7=0 and G2=G4=G6=0.

Figure 15C:
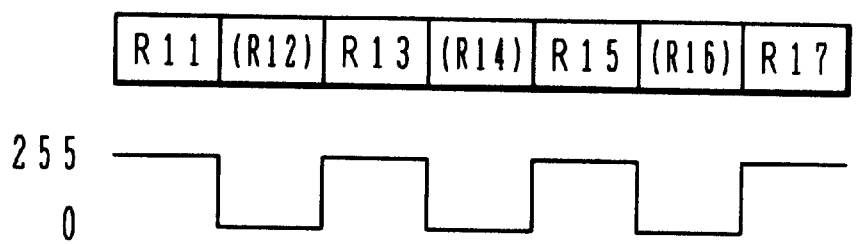

FIG. 15C shows pixel positions of red signals in the upper area of FIG. 15C and amplitudes of red signals in the lower area thereof. Red signals R11, R13, R15, and R17 have values picked up with the CCD camera and can directly use these values. These red signals are R11=R12=R15=R17=255. The other red signals are R12=R14=R16=0 at the pixels of the second, fourth, and sixth columns obtained through interpolation in a color difference signal space to be described later. This interpolation can reproduce red components in the original chrominance signal shown in the lower area of FIG. 15A, without generating noises.

Figure 15D:
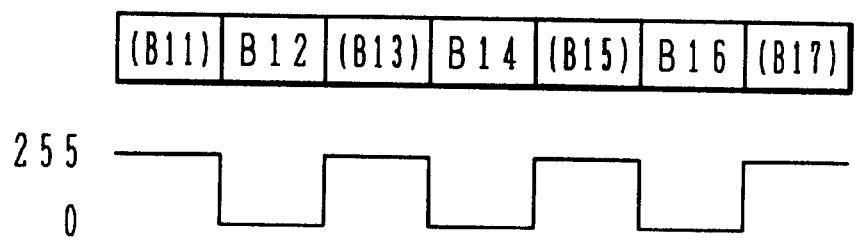

FIG. 15D shows pixel positions of blue signals in the upper area of FIG. 15D and amplitudes of blue signals in the lower area thereof. Blue signals B12, B14, and B16 have values picked up with the CCD camera and can directly use these values. These blue signals are B12=B14=B16=0. The other blue signals are B11=B13=B15=B17=255 at the pixels of the first, third, fifth, and seventh columns obtained through interpolation similar to that used by red signals. This interpolation can reproduce blue components in the original chrominance signal shown in the lower area of FIG. 15A, without generating noises.

FIGS. 16A to 16E show the details of an interpolation method for red signals shown in FIG. 15C.

FIG. 16A shows a chrominance signal at the first row LN1. The light signal shown in the lower area of FIG. 15A is incident upon the first row LN1. Values in parentheses indicate an amplitude of the chrominance signal.

First, R and G primary color signals shown in FIG. 16A are converted into a color difference signal Cr. Namely, mapping from the primary color space to a color difference space is performed. A Y-Cb-Cr space and an R-G-B space have the following relations.

$$Y=0.3R+0.59G+0.11B \quad (27)$$

$$Cr=0.7R-0.59G-0.11B \quad (28)$$

$$Cb=-0.3R-0.59G+0.89B \quad (29)$$

where Y is a luminance signal.

The equation (28) can be approximated to the following equation (3) and the equation (29) can be approximated to the following equation (31).

$$Cr \approx R-G \quad (30)$$

$$Cb \approx B-G \quad (31)$$

Cr signal for each pixel shown in FIG. 16A is obtained from the equation (30). In this case, however, Cr signals at the pixels of the first, third, fifth, and seventh columns where both G and R signals are already present, are obtained from the following equations.

$$Cr11=R11-G1=255-255=0$$

$$Cr11=R13-G3=255-255=0$$

$$Cr15=R15-G5=255-255=0$$

$$Cr17=R17-G7=255-255=0$$

Next, the other color difference signals (FIG. 16C) are obtained through interpolation using the above calculated color difference signals (FIG. 16B). Namely, the color difference signals Cr12, Cr14, and Cr18 at the pixels of the second, fourth, and sixth columns where R signals are not present are obtained by the following linear interpolation.

$$Cr12=(Cr11+Cr13)/2=0$$

$$Cr14=(Cr13+Cr15)/2=0$$

$$Cr16=(Cr15+Cr17)/2=0$$

This interpolation is not limited only to an interpolation using adjacent two pixels, but may use pixels more than two pixels or one pixel. The interpolation is not limited only to a linear interpolation, but weighing interpolation may be used.

Next, the interpolated color difference signals Cr (FIG. 16C) are changed to R primary signals (FIG. 16D). The primary color signals R12, R14, and R16 are obtained from the equation (30) as in the following.

$$R12=Cr12+G2=0+0=0$$

$$R14=Cr14+G4=0+0=0$$

$$R16=Cr16+G6=0+0=0$$

As shown in FIG. 16D, the interpolated signals R12, R14, and R16 are obtained. Red signals shown in FIG. 16E include the interpolated seven signals R11 to R17 and are the same as the red signals shown in FIG. 15C. With the above-described interpolation, red components in the light signal incident upon the first row shown in the lower cells of FIG. 16A can be reproduced without noises, and the lowered resolution and generation of pseudo colors (essentially absent in a subject to be picked up) can be suppressed.

For example, if R12 red signal shown in FIG. 16A is obtained through averaging by the following equation (32), it becomes that R12=255 although the correct value is R12=0. R12 red signal therefore contains noises which may cause a lowered resolution and pseudo colors.

$$R12=(R11+R13)/2=255 \quad (32)$$

Specific interpolation has been described above. In general, a red signal $R_n$ at the pixel of the n-th column can be interpolated by the following general equation.

$$R_n=G_n+\{(R_{n-1}-G_{n-1})+(R_{n+1}-G_{n+1})\}/2$$

Also a blue signal can be interpolated by a similar interpolation to that used by the red signal.

The reason why the above-described interpolation method can suppress a lowered image resolution will be described.

The equations (27) to (29) show that the color difference signal space (Y-Cb-Cr) is different from the primary color signal space (R-G-B). Since interpolation in the primary color space is performed by a simple averaging process of red signals, the luminance (Y) signal is influenced more or less and may have noises. It is known that as compared to Cr and Cb signals, the luminance (Y) signal greatly influences the resolution. Interpolation in the primary color signal space therefore lowers the resolution.

In this embodiment, interpolation is performed in the color difference signal space. Specifically, Cr and Cb signals are interpolated and Y signal is not changed. Since Y signal is not changed, a lowered resolution amount can be reduced drastically. In this embodiment, since interpolation is performed in the color difference space, the resolution can be suppressed from being lowered.

Next, the reason why generation of pseudo colors can be suppressed by using the embodiment interpolation method will be described.

Pseudo colors are likely to be produced at an edge (contour) of a subject to the picked up. Consider the case wherein the white/black repetition pattern shown in FIG. 16A is interpolated by the interpolation method through simple averaging (equation (33)). The red signals R12=R14=R16=255 obtained through interpolation become pseudo colors. Red pseudo colors are therefore produced at the pixels of the second, fourth, and sixth columns where black color is to be produced essentially.

Consider the case wherein the white/black repetition pattern shown in FIG. 16A is interpolated by the embodiment interpolation method. As shown in FIG. 16C, red signals R12=R14=R16=0 obtained by the interpolation do not become pseudo colors. Black colors are therefore produced at the pixels of the second, fourth, and sixth columns where black color is to be produced essentially. With the embodiment interpolation method, generation of pseudo colors can be suppressed.

Next, a method of obtaining R12 signal in the block shown in FIG. 14A will be described. R23 signal can be obtained in the similar manner to that used by R21 signal.

FIG. 14C shows pixels at the first column CL1 including R21 signal at the pixel to be interpolated. The left cells indicate green signals at the first column CL1, and the right cells indicate red signals at the same first column CL1. Red and blue signals at the first column CL1 can be obtained in the similar manner to that used for the first row LN1 described earlier. Instead of the horizontal interpolation for the first row LN1, the vertical interpolation is performed for the first column CL1.

Red signals R12, R21, R23, and R32 shown in FIG. 14A can be obtained in the above manner. Next, a method of interpolating R22 red signal at the center pixel will be described. The center pixel has originally a blue signal (FIG. 3A), and there is no green signal. This green signal at the center pixel can be obtained through interpolation. While this interpolation is performed, the edge direction data 22 (FIG. 7B) is stored. By using the edge data 22, R21 red signal is interpolated.

If the edge data 22 indicates a vertical edge, R21 red signal is obtained through averaging of upper and lower two pixels by the following equation.

$$R22=(R12+R32)/2$$

If the edge data 22 indicates a horizontal edge, R22 red signal is obtained through averaging of right and left two pixels by the following equation.

$$R22=(R21+R23)/2$$

If the edge data 22 indicates a no-edge, R22 red signal is obtained through averaging of adjacent four pixels by the following equation.

$$R22=(R12+R21+R23+R32)/4$$

R22 red signal may be interpolated in the color difference space. In this case, vertical or horizontal interpolation is performed in accordance with the edge data 22.

Figure 10:
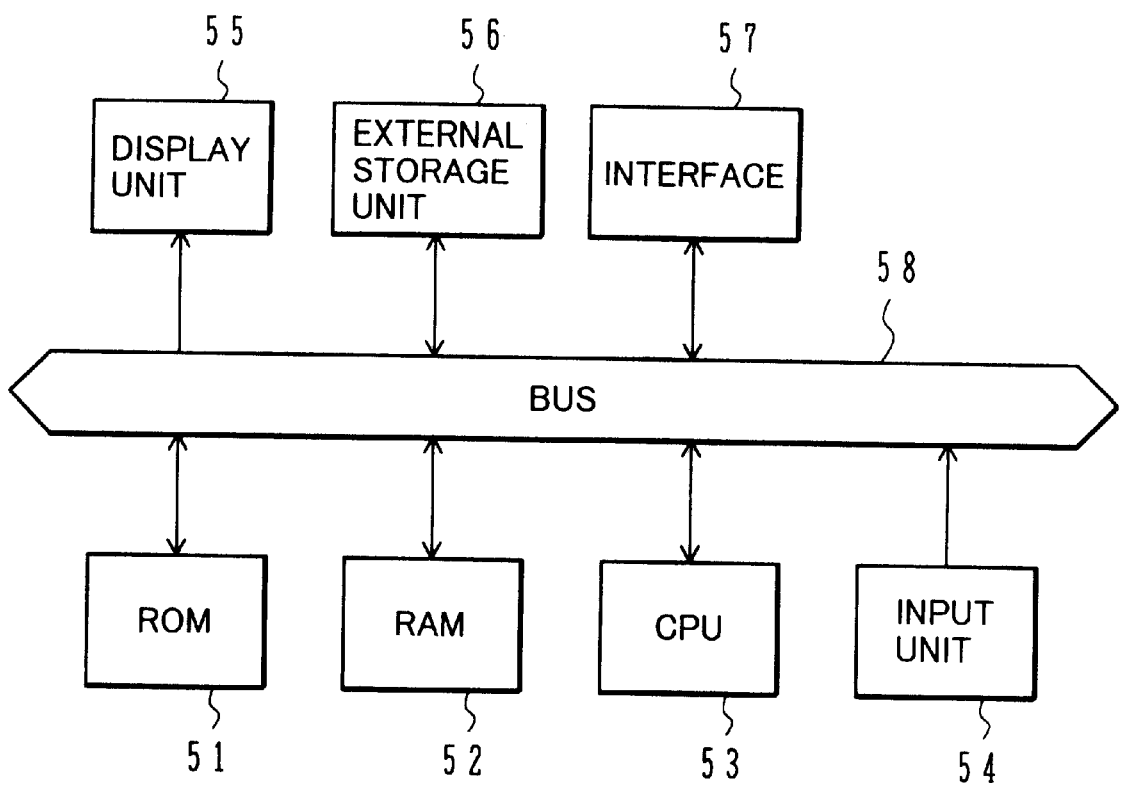
FIG. 10 is a block diagram showing the structure of hardware which executes the processes shown in the flow chart of FIG. 1 by using computer programs.
Figure 12A:
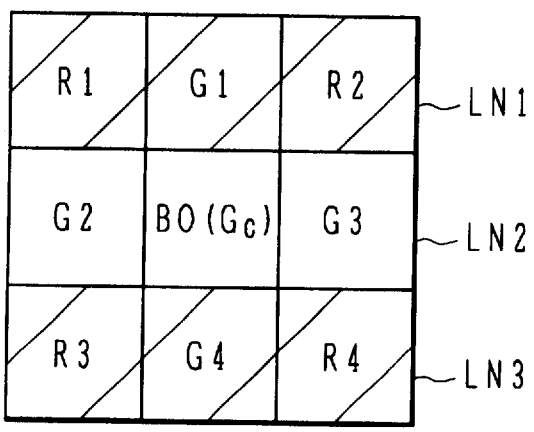
FIGS. 12A to 12D are diagrams showing block patterns containing two edges in the 3×3 block shown in FIG. 3A.
Figure 12B:
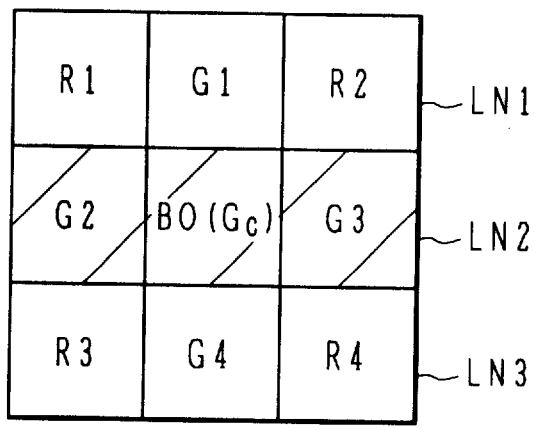
Figure 12C:
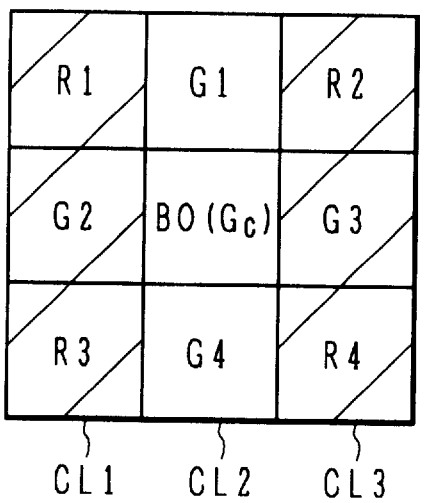
Figure 12D:
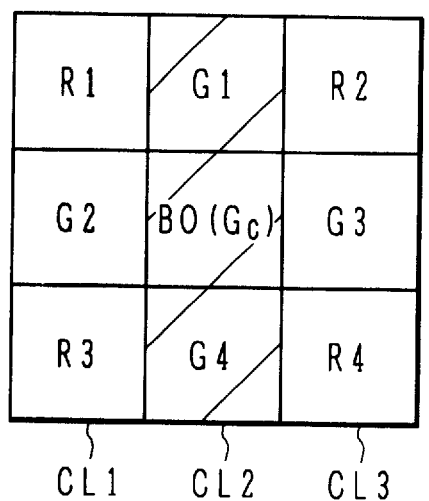
Figure 13A:
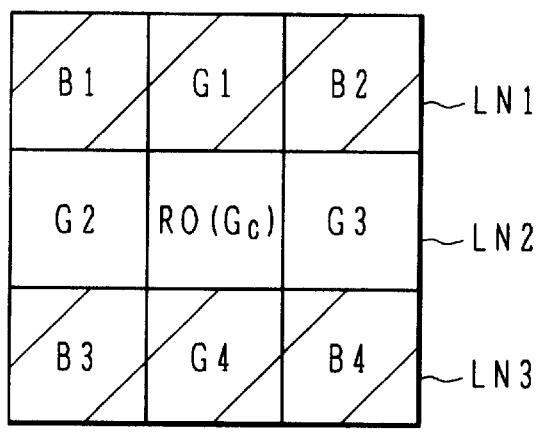
FIGS. 13A to 13D are diagrams showing block patterns containing two edges in the 3×3 block shown in FIG. 3D.
Figure 13B:
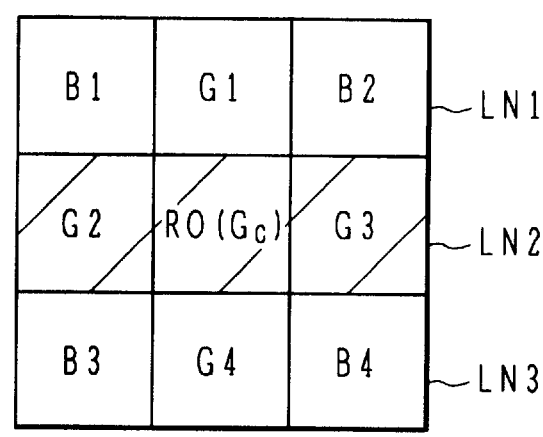
Figure 13C:
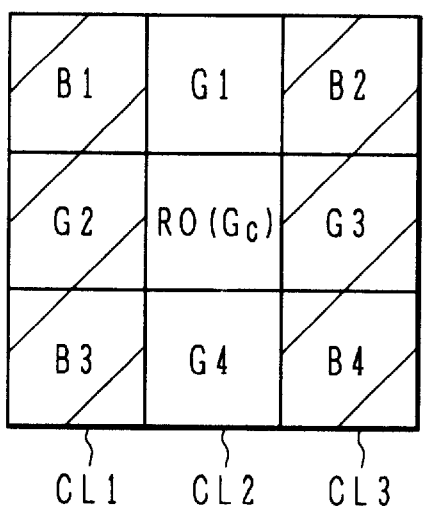
Figure 13D:
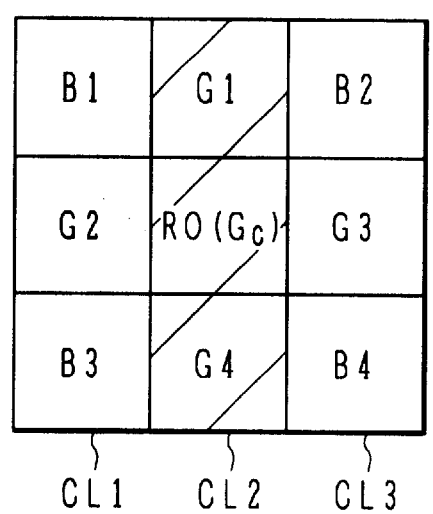

FIG. 10 shows the structure of hardware executing the processes of the flow chart shown in FIG. 1 by using computer programs.

A bus 58 is connected to a ROM 51, a RAM 52, a CPU 53, an input unit 54, a display unit 55, an external storage unit 56, and an interface unit 57.

ROM 51 stores programs for executing the processes of the flow chart shown in FIG. 1. The programs are stored in ROM 51 not in a limitative sense, and may be stored in RAM 52 or the external storage unit 56. ROM 51 also stores parameters and the like.

RAM 52 includes a frame memory for storing image data. RAM also stores flags and has a working area for CPU 53 such as registers and buffers.

The external storage unit 56 stores programs, image data and the like and may be a floppy disk drive (FDD), a hard disk drive (HDD), or a compact disk read-only memory (CD-ROM).

CPU 53 performs arithmetic operations and data processing in accordance with the programs. Namely, it performs an interpolation process of a chrominance signal in accordance with image data, and stores the interpolated image data in RAM 52 or in the external storage unit 56.

The interface unit 57 communicates with external apparatuses. CPU 53 can transfer programs and image data to and from the external apparatuses via the interface unit 57. For example, it can receive programs and image data from the external apparatuses and store them in RAM 52 or in the external storage unit 56.

The input unit 54 includes a CCD camera or an image scanner, and operation switches. CPU 53 fetches image data from the CCD camera or image scanner. An operator instructs various processes by using the operation switches. The display unit 55 displays image data and various parameters.

In this embodiment, G signal is interpolated by a method different from that used for R and B signals. R and B signals may be interpolated by the same method as that used for G signal. G s ignal may be interpolated by the same method as that used for R and B signals. Similar interpolation may be performed for other image signals such as Y, Cb and Cr, and cyan, magenta, and yellow complementary color signals.

It is not limited to the process in the unit of 3×3 block, but a larger block may be used. If the process is executed in the unit of larger block, an interpolation precision can be improved by using a larger number of pixels, although the process time is prolonged.

The present invention has been described in connection with the preferred embodiments. The invention is not limited only to the above embodiments. It is apparent that various modifications, improvements, combinations, and the like can be made by those skilled in the art.

What is claimed is:

1. An image signal processing apparatus comprising:

first edge judgement means for judging from at least four pixels adjacent to an object pixel whether the object pixel constitutes a single edge;

first edge direction judging means for judging whether the single edge is horizontal or vertical, if said first edge judging means judges that the object pixel constitutes the single edge;

interpolating means for interpolating the object pixel in accordance with at least right and left two pixels adjacent to the object pixel in a horizontal direction, if said first edge direction judging means judges that the single edge is horizontal, and for interpolating the object pixel in accordance with at least upper and lower two pixels adjacent to the object pixel in a vertical direction, if said first edge direction judging means judges that the single edge is vertical;

second edge judgement means for judging from the at least four pixels adjacent to the object pixel whether the object pixel constitutes two edges, if said first edge judgement means judges that the object pixel does not constitute the single edge; and second edge direction judging means for judging whether the two edges are horizontal or vertical, if said second edge judging means judges that the object pixel constitutes the two edges, wherein said interpolating means interpolates the object pixel in accordance with at least right and left two pixels adjacent to the object pixel in the horizontal direction, if said second edge direction judging means judges that the two edges are horizontal, and interpolates the object pixel in accordance with at least upper and lower two pixels adjacent to the object pixel in the vertical direction, if said second edge direction judging means judges that the two edges are vertical.

2. An image signal processing apparatus according to claim 2, wherein said interpolating means interpolates the object pixel in accordance with at least four pixels adjacent to the object pixel, if said second edge judging means judges that the object pixel does not constitutes the two edges.

3. An image signal processing apparatus according to claim 2, wherein the image signal processing apparatus sequentially interpolates each of a plurality of pixels in an image as the object pixel and further comprises:

storage means for storing an edge direction of each of the plurality of object pixels, the edge direction being judged by said first and second edge direction judging means; and re-judging means for re-judging that the object pixel has a different direction if a majority of the edge directions of pixels adjacent to the object pixel and stored in said storage means has an edge direction different from an edge direction of the object pixel, and for instructing said interpolating means to interpolate the object pixel or for interpolating the object pixel.

4. An image signal processing apparatus according to claim 1, wherein said first edge judging means judges whether the object pixel constitutes the single edge in accordance with a difference between values of right and left pixels adjacent to the object pixel in the horizontal direction and a difference between values of upper and lower pixels adjacent to the object pixel in the vertical direction.

5. An image signal processing apparatus according to claim 1, wherein said first edge direction judging means judges an edge direction in accordance with a difference between values of right and left pixels adjacent to the object pixel in the horizontal direction and a difference between values of upper and lower pixels adjacent to the object pixel in the vertical direction.

6. An image processing apparatus according to claim 5, wherein the judging means determines an edge direction based on a relative value of an absolute value of the difference between values of the right and left pixels and an absolute value of the difference between values of the upper and lower pixels.

7. An image signal processing apparatus according to claim 1, wherein the image signal processing apparatus sequentially interpolates each of a plurality of pixels in an image as the object pixel and said second edge direction judging means judges an edge direction in accordance with a value of a pixel shifted by one pixel in the horizontal direction and then in the vertical direction from the object pixel and interpolated by said interpolating means.

8. An image signal processing apparatus according to claim 1, wherein said second edge direction judging means comprises: horizontal direction difference means for calculating a difference of values between a first column including the object pixel and upper and lower pixels adjacent to the object pixel in the vertical direction and a second column adjacent to the first column and disposed in the vertical direction; vertical direction difference means for calculating a difference of values between a first row including the object pixel and right and left pixels adjacent to the object pixel in the horizontal direction and a second row adjacent to the first row and disposed in the horizontal direction; and difference judging means for judging an edge direction in accordance with the difference of values between the first and second columns and the difference of values between the first and second rows.

9. An image signal processing apparatus according to claims 8, wherein said horizontal direction difference means calculates a difference between a sum of values of at least first two pixels among the object pixel and upper and lower pixels adjacent to the object pixel in the first column and a sum of values of at least second two pixels adjacent to the first two pixels in the horizontal direction in the second column, and said vertical direction difference means calculates a difference between a sum of values of at least first two pixels among the object pixel and right and left pixels adjacent to the object pixel in the first row and a sum of values of at least second two pixels adjacent to the first two pixels in the vertical direction in the second row.

10. An image signal processing apparatus according to claim 9, wherein said horizontal direction difference means calculates a difference between a sum of values of first three pixels including the object pixel and upper and lower pixels adjacent to the object pixel in the first column and a sum of values of second three pixels adjacent to the first three pixels in the horizontal direction in the second column, and said vertical direction difference means calculates a difference between a sum of values of first three pixels including the object pixel and right and left pixels adjacent to the object pixel in the first row and a sum of values of second three pixels adjacent to the first three pixels in the vertical direction in the second row.

11. An image signal processing apparatus according to claim 1, wherein said second edge judging means judges whether the object pixel constitutes the two edges, in accordance with a sum of values of right and left pixels adjacent to the object pixel in the horizontal direction and a sum of values of upper and lower pixels adjacent to the object pixel in the vertical direction.

12. An image signal processing apparatus comprising:
first edge judgement means for judging from at least four pixels adjacent to an object pixel whether the object pixel constitutes a single edge;
first edge direction judging means for judging whether the single edge is horizontal or vertical, if said first edge judging means judges that the object pixel constitutes the single edge;
interpolating means for interpolating the object pixel in accordance with at least right and left two pixels adjacent to the object pixel in a horizontal direction, if said first edge direction judging means judges that the single edge is horizontal, and for interpolating the object pixel in accordance with at least upper and lower two pixels adjacent to the object pixel in a vertical direction, if said first edge direction judging means judges that the single edge is vertical;
wherein the image signal processing apparatus sequentially interpolates each of a plurality of pixels in an image as the object pixel;
storage means for storing an edge direction of each of the plurality of object pixels, the edge direction being judged by said first edge direction judging means; and
re-judging means for re-judging that the object pixel has a different direction if a majority of the edge directions of pixels adjacent to the object pixel and stored in said storage means has an edge direction different from an edge direction of the object pixel, and for instructing said interpolating means to interpolate the object pixel or for interpolating the object pixel.

13. An image signal processing apparatus for sequentially interpolating each of a plurality of pixels in an image as the object pixel, comprising:
edge direction judging means for judging whether an edge constituted by the object pixel is horizontal or vertical;
storage means for storing an edge direction of each of the plurality of object pixels judged by said edge judging means:
edge direction re-judging means for re-judging that the object pixel has a different edge direction if a majority of the edge directions of pixels adjacent to the object pixel and stored in said storage means has an edge direction different from an edge direction of the object pixel; and
interpolating means for interpolating the object pixel in accordance with at least right and left two pixels adjacent to the object pixel in a horizontal direction, if said edge direction judging means or said edge direction re-judging means judges that the edge is horizontal, and for interpolating the object pixel in accordance with at least upper and lower two pixels adjacent to the object pixel in a vertical direction, if said edge direction judging means or said edge direction re-judging means judges that the edge is vertical.

14. An image signal processing apparatus comprising:
chrominance signal acquiring means for acquiring at least green signals from some pixels of a one-dimensional pixel array and red or blue signals from other pixels;
green signal interpolating means for obtaining green signals of all pixels through interpolation between pixels of the pixel array;
first converting means for obtaining as a red color difference signal a difference between red and green signals at a same pixel in the pixel array and obtaining as a blue color difference signal a difference between blue and green signals at the same pixel;
color signal interpolating means for interpolating the red color difference signal and the blue color difference signal by using pixels of the pixel array, in accordance with the red color difference signal and the blue color difference signal converted by said first converting means; and
second converting means for obtaining the red signal and the blue signal by adding the green signal at the same pixel to the red color difference signal and the blue color difference signal interpolated by said color signal interpolating means.

15. An image signal processing apparatus according to claim 14, wherein said chrominance signal acquiring means acquires a chrominance signal of a two-dimensional pixel matrix, and said green signal interpolating means and said color difference signal interpolating means interpolate by using pixels of the two-dimensional pixel matrix.

16. An image signal processing apparatus according to claim 15, wherein said green signal interpolating means comprises: edge judging means for judging whether an object pixel to be interpolated constitutes an edge; edge direction judging means for judging whether a direction of the edge is vertical or horizontal, if said edge judging means judges that the object pixel constitutes the edge; and interpolating means for interpolating the green signal in accordance with the direction of the edge, if said edge judging means judges that the object pixel constitutes the edge, and the image signal processing apparatus further comprises red/blue signal interpolating means for interpolating the red signal and the blue signal in accordance with the red signal and the blue signal obtained by said second converting means and the direction of the edge of the object pixel.

17. An image signal processing apparatus according to claim 16, wherein said red/blue signal interpolating means interpolates by using at least upper and lower two pixels adjacent to the object pixel, if the direction of the edge is vertical, and interpolates by using at least right and left two pixels adjacent to the object pixel, if the direction of the edge is horizontal.

18. A medium storing a program to be executed by a computer, the program comprising the steps of:
   (a) judging from four pixels adjacent to an object pixel whether the object pixel constitutes a single edge;
   (b) judging whether the single edge is horizontal or vertical, if it is judged that the object pixel constitutes the single edge;
   (c) interpolating the object pixel in accordance with at least right and left two pixels adjacent to the object pixel in a horizontal direction, if it is judged that the single edge is horizontal, and interpolating the object pixel in accordance with at least upper and lower two pixels adjacent to the object pixel in a vertical direction, if it is judged that the single edge is vertical;
   (d) judging from four pixels adjacent to the object pixel whether the object pixel constitutes two edges, if said step (a) judges that the object pixel does not constitute the single edge; and
   (e) judging whether the two edges are horizontal or vertical, if it is judged that the object pixel constitutes the two edges,
   wherein said step (c) interpolates the object pixel in accordance with at least right and left two pixels adjacent to the object pixel in the horizontal direction, if said step (e) judges that the two edges are horizontal, and interpolates the object pixel in accordance with at least upper and lower two pixels adjacent to the object pixel in the vertical direction, if said step (e) judges that the two edges are vertical.

19. A medium storing a program according to claim 18, wherein said step (c) interpolates the object pixel in accordance with at least four pixels adjacent to the object pixel, if said step (d) judges that the object pixel does not constitutes the two edges.

20. A medium storing a program according to claim 18, wherein the program sequentially interpolates each of a plurality of pixels in an image as the object pixel and further comprises the step of:
   (f) re-judging that the object pixel has a different direction if a majority of the edge directions of pixels adjacent to the object pixel and judged by said steps (b) and (e) has an edge direction different from an edge direction of the object pixel, and instructing to interpolate the object pixel at said step (c) or interpolating the object pixel.

21. A medium storing a program according to claim 18, wherein said step (a) judges whether the object pixel constitutes the single edge in accordance with a difference between values of right and left pixels adjacent to the object pixel in the horizontal direction and a difference between values of upper and lower pixels adjacent to the object pixel in the vertical direction.

22. A medium storing a program according to claim 18, wherein said step (b) judges an edge direction in accordance with a difference between values of right and left pixels adjacent to the object pixel in the horizontal direction and a difference between values of upper and lower pixels adjacent to the object pixel in the vertical direction.

23. A medium according to claim 22, wherein the judgment of an edge direction comprises determining an edge direction based on a relative value of an absolute value of the difference between values of the right and left pixels and an absolute value of the difference between values of the upper and lower pixels.

24. A medium storing a program according to claim 18, wherein the program sequentially interpolates each of a plurality of pixels in an image as the object pixel and said step (e) judges an edge direction in accordance with a value of a pixel shifted by one pixel in the horizontal direction and then in the vertical direction from the object pixel and interpolated by said step (c).

25. A medium storing a program according to claim 18, wherein said step (e) comprises the steps of: (e-1) calculating a difference of values between a first column including the object pixel and upper and lower pixels adjacent to the object pixel in the vertical direction and a second column adjacent to the first column and disposed in the vertical direction; (e-2) calculating a difference of values between a first row including the object pixel and right and left pixels adjacent to the object pixel in the horizontal direction and a second row adjacent to the first row and disposed in the horizontal direction; and (e-3) judging an edge direction in accordance with the difference of values between the first and second columns and the difference of values between the first and second rows.

26. A medium storing a program according to claim 25, wherein said step (e-1) calculates a difference between a sum of values of at least first two pixels among the object pixel and upper and lower pixels adjacent to the object pixel in the first column and a sum of values of at least second two pixels adjacent to the first two pixels in the horizontal direction in the second column, and said step (e-2) calculates a difference between a sum of values of at least first two pixels among the object pixel and right and left pixels adjacent to the object pixel in the first row and a sum of values of at least second two pixels adjacent to the first two pixels in the vertical direction in the second row.

27. A medium storing a program according to claim 26, wherein said step (e-1) calculates a difference between a sum of values of first three pixels including the object pixel and upper and lower pixels adjacent to the object pixel in the first column and a sum of values of second three pixels adjacent to the first three pixels in the horizontal direction in the second column, and said step (e-2) calculates a difference between a sum of values of first three pixels including the object pixel and right and left pixels adjacent to the object pixel in the first row and a sum of values of second three pixels adjacent to the first three pixels in the vertical direction in the second row.

28. A medium storing a program according to claim 18, wherein aid step (d) judges whether the object pixel constitutes the two edges, in accordance with a sum of values of right and left pixels adjacent to the object pixel in the horizontal direction and a sum of values of upper and lower pixels adjacent to the object pixel in the vertical direction.

29. A medium storing a program to be executed by a computer, wherein the program sequentially interpolates each of a plurality of pixels in an image as the object pixel, the program comprising the steps of:
   (a) judging from four pixels adjacent to an object pixel whether the object pixel constitutes a single edge;

(b) judging whether the single edge is horizontal or vertical, if it is judged that the object pixel constitutes the single edge;

(c) interpolating the object pixel in accordance with at least right and left two pixels adjacent to the object pixel in a horizontal direction, if it is judged that the single edge is horizontal, and interpolating the object pixel in accordance with at least upper and lower two pixels adjacent to the object pixel in a vertical direction, if it is judged that the single edge is vertical;

(d) re-judging that the object pixel has a different direction if a majority of the edge directions of pixels adjacent to the object pixel and judged by said step (b) has an edge direction different from an edge direction of the object pixel, and instructing to interpolate the object pixel at said step (c) or interpolating the object pixel.

30. A medium storing a program for sequentially interpolating each of a plurality of pixels in an image as the object pixel, the program comprising the steps of:

(a) judging whether an edge constituted by the object pixel is horizontal or vertical;

(b) re-judging that the object pixel has a different edge direction if a majority of the edge directions of pixels adjacent to the object pixel and judged at said step (a) has an edge direction different from an edge direction of the object pixel; and (c) interpolating the object pixel in accordance with at least right and left two pixels adjacent to the object pixel in a horizontal direction, if said step (a) or (b) judges that the edge is horizontal, and for interpolating the object pixel in accordance with at least upper and lower two pixels adjacent to the object pixel in a vertical direction, if said step (a) or (b) judges that the edge is vertical.

31. A medium storing a program to be executed by a computer, the program comprising the steps of:

(a) acquiring at least green signals of some pixels of a one-dimensional pixel array and red or blue signals of other pixels;

(b) obtaining green signals of all pixels through interpolation between pixels of the pixel array;

(c) obtaining as a red color difference signal a difference between red and green signals of a same pixel in the pixel array and obtaining as a blue color difference signal a difference between blue and green signals of the same pixel;

(d) interpolating the red color difference signal and the blue color difference signal by using pixels of the pixel array, in accordance with the read color difference signal and the blue color difference signal converted by said step (c); and (e) obtaining the red signal and the blue signal by adding the green signal of the same pixel to the red color difference signal and the blue color difference signal interpolated by said step (d).

32. A medium storing a program according to claim 31, wherein said step (a) acquires a chrominance signal of a two-dimensional pixel matrix, and said steps (b) and (d) interpolate by using pixels of the two-dimensional pixel matrix.

33. A medium storing a program according to claim 32, wherein said step (b) comprises the steps of: (b-1) judging whether an object pixel to be interpolated constitutes an edge; (b-2) judging whether a direction of the edge is vertical or horizontal, if it is judged that the object pixel constitutes the edge; and (b-3) interpolating the green signal in accordance with the direction of the edge, if it is judged that the object pixel constitutes the edge, and the program further comprises the step of interpolating the red signal and the blue signal in accordance with the red signal and the blue signal obtained by said step (e).

34. A medium storing a program according to claim 33, wherein said step (f) interpolates by using at least upper and lower two pixels adjacent to the object pixel, if the direction of the edge is vertical, and interpolates by using at least right and left two pixels adjacent to the object pixel, if the direction of the edge is horizontal.

* * * * *